Patented Nov. 18, 1924.

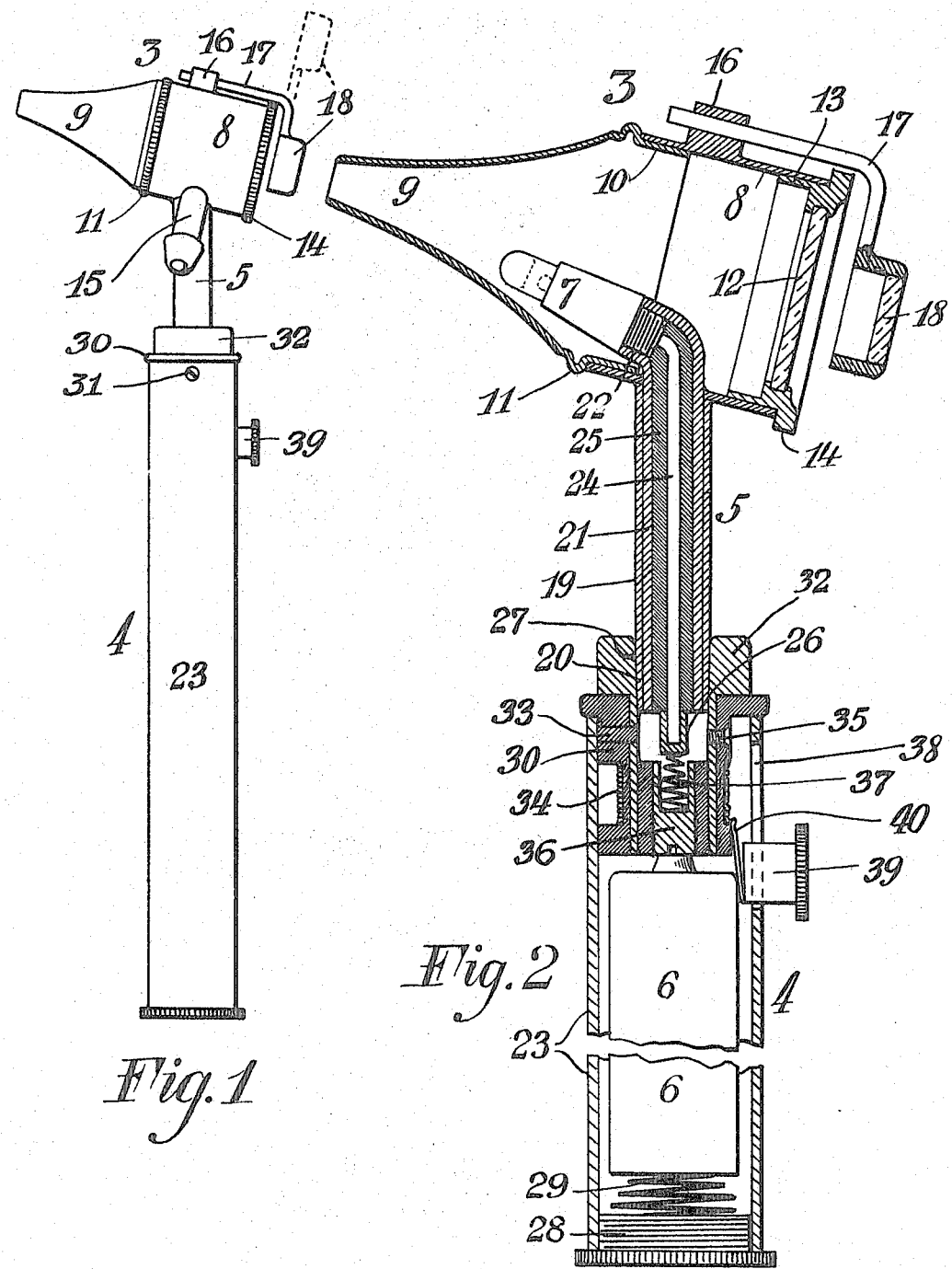

1,515,771

UNITED STATES PATENT OFFICE.

OSCAR GREENWALD, OF BROOKLYN, NEW YORK.

AURISCOPE.

Application filed December 18, 1922. Serial No. 607,748.

*To all whom it may concern:*

Be it known that I, OSCAR GREENWALD, a citizen of Hungary, and resident of Brooklyn, Kings County, New York, have invented certain new and useful, Improvements in Auriscopes, of which the following is a specification This invention relates to auriscopes and the object of the invention is to provide a generally improved instrument adapted for use in examining and treating the ear, nose, throat, eye or other parts of the human body and containing certain novel features with respect to simplicity of construction and efficiency and practicability in use and operation, all as will be hereinafter more particularly pointed out.

Accordingly my invention is embodied in an auriscope constructed and arranged as hereinafter set forth and as illustrated in the accompanying drawing in which—

Figure 1 is a side view of an auriscope embodying my invention, and

Figure 2 is an enlarged sectional view of the instrument with parts broken away.

Referring to the drawing the auriscope comprises two main parts, a head denoted 3 and a handle denoted 4. The head is provided with a depending stem 5 by means of which physical connection is made between the head and the handle, and which also serves to conduct the electrical current from a dry cell battery 6 located in the handle to a small electric lamp 7 located in the head.

More particularly the head comprises the vision tube 8 into which the speculum 9 is adapted to be held by friction, the speculum being provided with a relatively large annular flange 10 adapted to engage the inside of the vision tube 8 to maintain the speculum in proper position. A bead 11 assists in removing the speculum from the tube as is obvious.

The rear open end of the vision tube may be closed by large lens 12 the frame of which also has an annular flange 13 frictionally engaging the inside of the tube and a bead or knurled edge 14 to assist in removing the lens 12. The large lens 12 fits the tube 8 as a cap and seals the end of the instrument making it a perfect otoscope for testing the mobility of the malleus, and relaxation of the membrane tympani, and whereby it may also be used for aural massaging.

A nipple 15 is secured to one side of the tube 8 for the purpose of applying massage movement by the use of air from a hand air pump or bulb.

The tube 8 is provided with a bearing 16 on the top in which is journaled a bent stem or shaft 17 which carries a magnifying lens 18. When the large lens is removed, the small lens may be swung downward into position for magnifying purposes, while the rear opening of the tube 8 is free for the introduction of operating instruments. When not wanted, the small lens may be swung upward as shown in dotted lines in Figure 1, while it may be moved down for packing or carrying purpose when the large lens is in position.

The stem 5 comprises an outer sleeve 19 having a tapered lower end 20. The sleeve is fitted tightly over a lamp socket tube 21 which extends within the vision tube 8 and is threaded as at 22 to receive the small electric lamp 7. The tube 21 and sleeve 19 are soldered to the tube 8 and form one terminal of the lamp socket. The other terminal is formed by a rod 24 centrally disposed within the stem and separated from the terminal 19—21 by suitable insulation 25. The upper ends of the tube 21 and the rod 24 are bent forward to receive the lamp in proper position at the bottom of the speculum so as not to obstruct the vision through the tube 8.

The lower end of terminal rod 24 projects below the stem and is strengthened by a cap 26.

The handle 4 comprises a tube 23 containing a dry cell and closed in the usual manner by a cap 28 having a spring 29. Into the upper end of the tube 23 is fitted a connecting plug 30 of suitable insulating material as for instance fibre. The plug is secured in the handle tube by set screws as 31, see Figure 1.

The connecting plug carries a metal nipple 32 having an interiorly tapered hole 27 for receiving the tapered end 20 of the sleeve 19. The nipple extends down into the plug and is secured thereto by a pin 33 of insulating material. On the outside of the plug is wound a coil of wire 34 electrically connected to the nipple 32 by a screw 35. Centrally of the plug there is a conducting screw 36 having a spring 37. The tube 23 is slotted as at 38 and in the slot moves a sliding contact 39 having a contact finger 40 adapted to slide over and in contact with the coil 34.

In the use of the auriscope the speculum is inserted in the cavity to be examined and distended to facilitate the examination. At the same time the operator moves the sliding contact 39 upwards thereby closing the circuit thru the lamp and battery as follows. The current passes from the battery, through the conducting screw 36, spring 37, rod 24, through the lamp 7, thence through the terminal 19—21 to the nipple 32, screw 35, coil 34, sliding contact 39, handle tube 23, cap 28 and spring 29 back to the battery. The lamp then illuminates the part to be examined or treated. By adjusting the sliding contact 39 more or less of the coil 34 is brought into or out of the circuit, thus protecting the lamp and adjusting the light thereof, the coil and contact 39 acting as a rheostat.

The invention disclosed possesses several important and novel features. The speculum and the large lens being held friction-tight in the vision tube are maintained rigidly and fixedly in their respective positions, yet they may be quickly and easily removed. The manipulation of the large lens does not interfere with the positioning of the small lens which is placed quickly in any desired position within the area of the open rear end of the tube.

The head is quickly detached and quickly and firmly attached to the handle, providing at the same time good mechanical as well as electrical connection as set forth. It is further a distinct advantage that the head is freely rotatable on the handle so that the operator may use either hand in holding the instrument and operating the contact 39 which also operates as a switch.

While I have shown and described the handle as containing a dry cell for energizing the lamp, it would be within the scope of persons skilled in the art to employ the same or equivalent construction in connection with a source of electrical energy remote from the instrument itself. Other changes or different arrangements may be made within the scope of the invention without departing from the principle of the invention and the legitimate and intended scope of the appended claims.

I claim:—

1. In an auriscope the combination of a vision tube, a speculum frictionally and detachably held in one end of said tube, an electric lamp in said speculum, a stem extending angularly to one side of said vision tube and terminating in a tapered end, a handle having a tapered opening for receiving the tapered end of the stem whereby to connect said stem and handle frictionally in adjustable axial relationship and means in said stem and handle for producing light in the said lamp irrespective of the axially adjusted relationship between said stem and handle.

2. In an auriscope the combination of a vision tube, a speculum held frictionally and removably in one end thereof, a lens held frictionally and removably in the opposite end of said tube, said lens being of substantially the same diameter as the said tube, an electric lamp in said speculum in the visual line of the said lens, a stem extending angularly to one side of said tube, and terminating in a tapered end, electrical conductors for said lamp located within the said stem, a tubular handle having a tapered opening for receiving the said tapered end of the stem, whereby to connect said stem and handle frictionally in adjustable axial relationship, a battery in said handle and electric conducting means in said handle adapted to cooperate with the conductors aforesaid to electrically connect said lamp and battery.

OSCAR GREENWALD.